(12) United States Patent
Morimoto et al.

(10) Patent No.: US 10,489,427 B2
(45) Date of Patent: Nov. 26, 2019

(54) DOCUMENT CLASSIFICATION SYSTEM, DOCUMENT CLASSIFICATION METHOD, AND DOCUMENT CLASSIFICATION PROGRAM

(71) Applicant: FRONTEO, INC., Tokyo (JP)

(72) Inventors: Masahiro Morimoto, Tokyo (JP); Yoshikatsu Shirai, Tokyo (JP); Hideki Takeda, Tokyo (JP); Kazumi Hasuko, Tokyo (JP)

(73) Assignee: FRONTEO, INC., Tokyo (JP)

( * ) Notice: Subject to any disclaimer, the term of this patent is extended or adjusted under 35 U.S.C. 154(b) by 868 days.

(21) Appl. No.: 14/914,568

(22) PCT Filed: Aug. 28, 2014

(86) PCT No.: PCT/JP2014/072566
§ 371 (c)(1),
(2) Date: Jun. 13, 2016

(87) PCT Pub. No.: WO2015/030112
PCT Pub. Date: Mar. 5, 2015

(65) Prior Publication Data
US 2016/0239559 A1    Aug. 18, 2016

(30) Foreign Application Priority Data
Aug. 29, 2013 (JP) ................................ 2013-178529

(51) Int. Cl.
*G06F 16/93* (2019.01)
*G06F 16/28* (2019.01)
(Continued)

(52) U.S. Cl.
CPC .......... *G06F 16/287* (2019.01); *G06F 16/243* (2019.01); *G06F 16/24578* (2019.01); *G06F 16/93* (2019.01)

(58) Field of Classification Search
CPC ........ G06F 16/93; G06F 16/285; G06Q 50/18
See application file for complete search history.

(56) References Cited

U.S. PATENT DOCUMENTS 7,783,639 B1 * 8/2010 Bharat .................. G06F 16/951
707/736
8,468,143 B1 * 6/2013 Oztekin ............. G06Q 30/0281
707/706

(Continued)

FOREIGN PATENT DOCUMENTS

GB       2366036 A    2/2002
JP    1994-075995 A   3/1994
(Continued)

OTHER PUBLICATIONS

International Search Report PCT/JP2014/072566 dated Nov. 25, 2014.
(Continued)

*Primary Examiner* — Cheyne D Ly
(74) *Attorney, Agent, or Firm* — Brundidge & Stanger, P.C.

(57) ABSTRACT

The present invention includes: an extraction unit that extracts a specified quantity of documents, as targets to be classified by a user, from document information; a classification code accepting unit that accepts a classification code which is an identifier used when categorizing the documents, and is assigned by the user to each of the extracted documents; a database that records keywords selected from the extracted documents on the basis of the classification code; a score calculation unit that calculates a score which evaluates linkage strength between documents included in the document information, and the classification code on the basis of the keywords wherein the score calculation unit recalculates the score on the basis of a result of further extraction, by the extraction unit, of a specified quantity of (Continued)

documents, as targets to be classified by the user, from the document information according to the score.

6 Claims, 5 Drawing Sheets

(51) Int. Cl.
*G06F 16/242* (2019.01)
*G06F 16/2457* (2019.01)

(56) References Cited

U.S. PATENT DOCUMENTS

| | | | | |
|---|---|---|---|---|
| 8,620,742 | B2* | 12/2013 | Coit | G06Q 30/0263 705/14.1 |
| 8,713,023 | B1* | 4/2014 | Cormack | G06N 20/00 707/740 |
| 8,838,606 | B1* | 9/2014 | Cormack | G06N 20/00 707/737 |
| 8,914,376 | B2* | 12/2014 | Ravid | G06F 16/353 707/740 |
| 9,122,681 | B2* | 9/2015 | Cormack | G06N 20/00 |
| 2002/0069197 | A1 | 6/2002 | Katayama et al. | |
| 2010/0262615 | A1* | 10/2010 | Oztekin | G06F 16/353 707/768 |
| 2012/0239666 | A1 | 9/2012 | Morimoto et al. | |
| 2012/0246185 | A1 | 9/2012 | Morimoto et al. | |
| 2012/0290578 | A1 | 11/2012 | Morimoto et al. | |

FOREIGN PATENT DOCUMENTS

| | | |
|---|---|---|
| JP | 2002-7433 A | 1/2002 |
| JP | 2002-288088 A | 10/2002 |
| JP | 2011-191834 A | 9/2011 |
| JP | 2011-209930 A | 10/2011 |
| JP | 2011-209931 A | 10/2011 |
| JP | 2012-032859 A | 2/2012 |

OTHER PUBLICATIONS

JP Office Action dated Apr. 12, 2016 issued on the JP counterpart application No. 2015-534284.
Machine translation of JP 1994-075995 A (H6-75995 A).
Machine translation of JP 2002-288088.
Machine translation of the JP 2011-191834 A.
English translation of ISR (including Written Opinion of the ISA) for PCT/JP2014/072566, dated Nov. 25, 2014, 7 pages.
Machine translation of the Office Action for Patent Application No. JP2015-534284, dated Apr. 12, 2016, 3 pages.

* cited by examiner

DOCUMENT CLASSIFICATION SYSTEM, DOCUMENT CLASSIFICATION METHOD, AND DOCUMENT CLASSIFICATION PROGRAM

CROSS-REFERENCED TO RELATED APPLICATION(S)

This Application is a National Phase Patent Application and claims priority to and the benefit of International Application Number PCT/JP2014/072566, filed on Aug. 28, 2014, which claims priority to and the benefit of Japanese Patent Application No. 2013-178529, filed Aug. 29, 2013, the entire contents of all of which are incorporated herein by reference.

TECHNICAL FIELD

The present invention relates to a document classification system, a document classification method, and a document classification program. Particularly, the invention relates to a document classification system, document classification method, and document classification program with respect to document information regarding lawsuits.

BACKGROUND ART

Conventionally, when a crime or a legal conflict relating to computers such as unauthorized access or leakage of confidential information occurs, there have been proposed means or techniques that collect and analyze equipment, data, and electronic records required for investigation into the cause of the crime or legal conflict and clarify legal evidences of the crime or legal conflict.

Particularly, procedures such as eDiscovery (electronic discovery) are required for a civil lawsuit in the United State of America and both a plaintiff and a defendant involved in the lawsuit are liable to submit all pieces of related digital information as evidences. Therefore, they need to submit digital information recorded in computers and/or servers as the evidences.

Meanwhile, due to the rapid development and spreading of information technologies, most information in today's business world is produced by computers, so that digital information is abundant even within the same company.

Therefore, in the preparatory work of gathering evidentiary materials to be submitted to a court of law, mistakes can easily occur where even confidential digital information, which is not necessarily related with the relevant lawsuit, may be included in the evidentiary materials. Another problem is that confidential document information which is not related to the relevant lawsuit is submitted.

In recent years, techniques related to document information in forensic systems have been proposed in PTL 1 to PTL 3. PTL 1 discloses a forensic system that: designates a specific person from at least one or more users included in user information; extracts only digital document information which is accessed by the specific person on the basis of access history information about the designated specific person; sets accessory information indicating whether each document file of the extracted digital document information is related to a lawsuit or not; and outputs the document files related to the lawsuit on the basis of the accessory information.

Furthermore, PTL 2 discloses a forensic system that: displays recorded digital information; sets user-identifying information indicating to which one of users included in user information each of a plurality of document files is related; sets settings so that the set user-identifying information will be recorded in a storage unit; designates at least one or more users; searches for a document file in which the user-specifying information corresponding to the designated user is set; sets accessory information indicating whether the searched document file is related to a lawsuit or not, on a display unit; and outputs the document file related to the lawsuit on the basis of the accessory information.

Furthermore, PTL 3 discloses a forensic system that: receives designation of at least one or more document files included in digital document information; receives designation indicating into which language the designated document file should be translated; translates the designated document file into the designated language; extracts a common document file indicating the same content as the designated document file from the digital document information recorded in a recording unit; generates translation-related information indicating that the extracted common document file is translated by employing the translation content of the translated document file; and outputs a document file related to a lawsuit on the basis of the translation-related information.

CITATION LIST

Patent Literature

PTL 1: Japanese Patent Application Laid-Open (Kokai) Publication No. 2011-209930
PTL 2: Japanese Patent Application Laid-Open (Kokai) Publication No. 2011-209931
PTL 3: Japanese Patent Application Laid-Open (Kokai) Publication No. 2012-32859

SUMMARY OF INVENTION

Problems to be Solved by the Invention

However, regarding the forensic systems like those disclosed in PTL 1 to PTL 3, there are demands for further enhancements of precision and a recall of the document classification result.

In light of the circumstances described above, it is an object of the present invention to provide a document classification system, document classification method, and document classification program capable of enhancing at least either the precision or the recall of the document classification result.

Means for Solving the Problems

In order to solve the above-described problems, a document classification system according to an aspect of the present invention includes: an extraction unit that extracts a specified quantity of documents, as targets to be classified by a user, from document information; a classification code accepting unit that accepts a classification code which is an identifier used when categorizing the documents, and is assigned by the user to each of the extracted documents; a database that records keyword(s) selected from the extracted documents on the basis of the classification code; a score calculation unit that calculates a score which evaluates linkage strength between documents included in the document information, and the classification code on the basis of the keywords; and a judgment unit that judges whether the number of times of the calculation of the score has reached a specified number of times or not; wherein when the judgment unit determines that the number of times of the calculation of the score has not reached the specified number of times, the score calculation unit recalculates the score on the basis of a result of further extraction, by the extraction unit, of a specified quantity of documents, as targets to be classified by the user, from the document information according to the score.

In order to solve the above-described problems, a document classification system according to an aspect of the present invention is a document classification system for acquiring digital information recorded in a plurality of computers or servers, analyzing document information included in the acquired digital information, and classifying documents included in the document information, wherein the document classification system includes: a score calculation unit that calculates a score, which evaluates linkage strength between the documents included in the document information and a classification code that is an identifier used when categorizing the documents, for each of the documents; an extraction unit that extracts documents in a specified order on the basis of the calculated score; a classification code accepting unit that accepts the classification code assigned by a user to the extracted documents; a selection unit that classifies the extracted documents by the classification code on the basis of the classification code and analyzes and selects keyword(s) which appear commonly in the classified documents; and a search unit that searches the document information for the selected keywords; wherein the score calculation unit recalculates the score for each document included in the document information by using a search result by the search unit and an analysis result by the selection unit.

Furthermore, the document classification system according to an aspect of the present invention can repeats extracting the documents in descending order of the calculated score and newly calculating the score for the extracted documents for a plurality of number of times.

Furthermore, regarding the document classification system according to an aspect of the present invention, the score calculation unit can calculate the score according to the keywords appearing in the documents and weighting of each keyword.

Furthermore, regarding the document classification system according to an aspect of the present invention, the score calculation unit can change at least either a type or number of the keywords every time the score is calculated.

In order to solve the above-described problems, a document classification method according to an aspect of the present invention includes: an extraction step of extracting a specified quantity of documents, as targets to be classified by a user, from document information; a classification code accepting step of accepting a classification code which is an identifier used when categorizing the documents, and is assigned by the user to each of the extracted documents; a score calculation step of referring to a database that records keyword(s) selected from the extracted documents on the basis of the classification code, and calculating a score which evaluates linkage strength between documents included in the document information, and the classification code on the basis of the keywords; and a judgment step of judging whether the number of times of the calculation of the score has reached a specified number of times or not; wherein in the score calculation step, when it is determined in the judgment step that the number of times of the calculation of the score has not reached the specified number of times, the score is recalculated on the basis of a result of further extraction of a specified quantity of documents, as targets to be classified by the user, from the document information according to the score in the extraction step.

In order to solve the above-described problems, a document classification method according to an aspect of the present invention is a document classification method for acquiring digital information recorded in a plurality of computers or servers, analyzing document information included in the acquired digital information, and classifying documents included in the document information, wherein the document classification method includes: calculating a score, which evaluates linkage strength between the documents included in the document information and a classification code that is an identifier used when categorizing the documents, for each of the documents; extracting documents in a specified order on the basis of the calculated score; accepting the classification code assigned by a user to the extracted documents; classifying the extracted documents by the classification code on the basis of the classification code and analyzing and selecting keyword(s) which appear commonly in the classified documents; searching the document information for the selected keywords; and recalculating the score for each document included in the document information by using the search result and the analysis result.

In order to solve the above-described problems, a document classification program according to an aspect of the present invention has a computer implement: an extraction function that extracts a specified quantity of documents, as targets to be classified by a user, from document information; a classification code accepting function that accepts a classification code which is an identifier used when categorizing the documents, and is assigned by the user to each of the extracted documents; a score calculation function that refers to a database that records keyword(s) selected from the extracted documents on the basis of the classification code, and calculates a score which evaluates linkage strength between documents included in the document information, and the classification code on the basis of the keywords; and a judgment function that judges whether the number of times of the calculation of the score has reached a specified number of times or not; wherein when the judgment function determines that the number of times of the calculation of the score has not reached the specified number of times, the score calculation function recalculates the score on the basis of a result of further extraction, by the extraction function, of a specified quantity of documents, as targets to be classified by the user, from the document information according to the score.

Advantageous Effects of Invention

The document classification system, document classification method, and document classification program according to the present invention extract documents on the basis of a score calculated for each document and then recalculate the score for each document on the basis of a classification result of the extracted documents. Therefore, at least either the precision or the recall of the document classification result will be enhanced.

DESCRIPTION OF EMBODIMENTS

Embodiment

Figure 1:
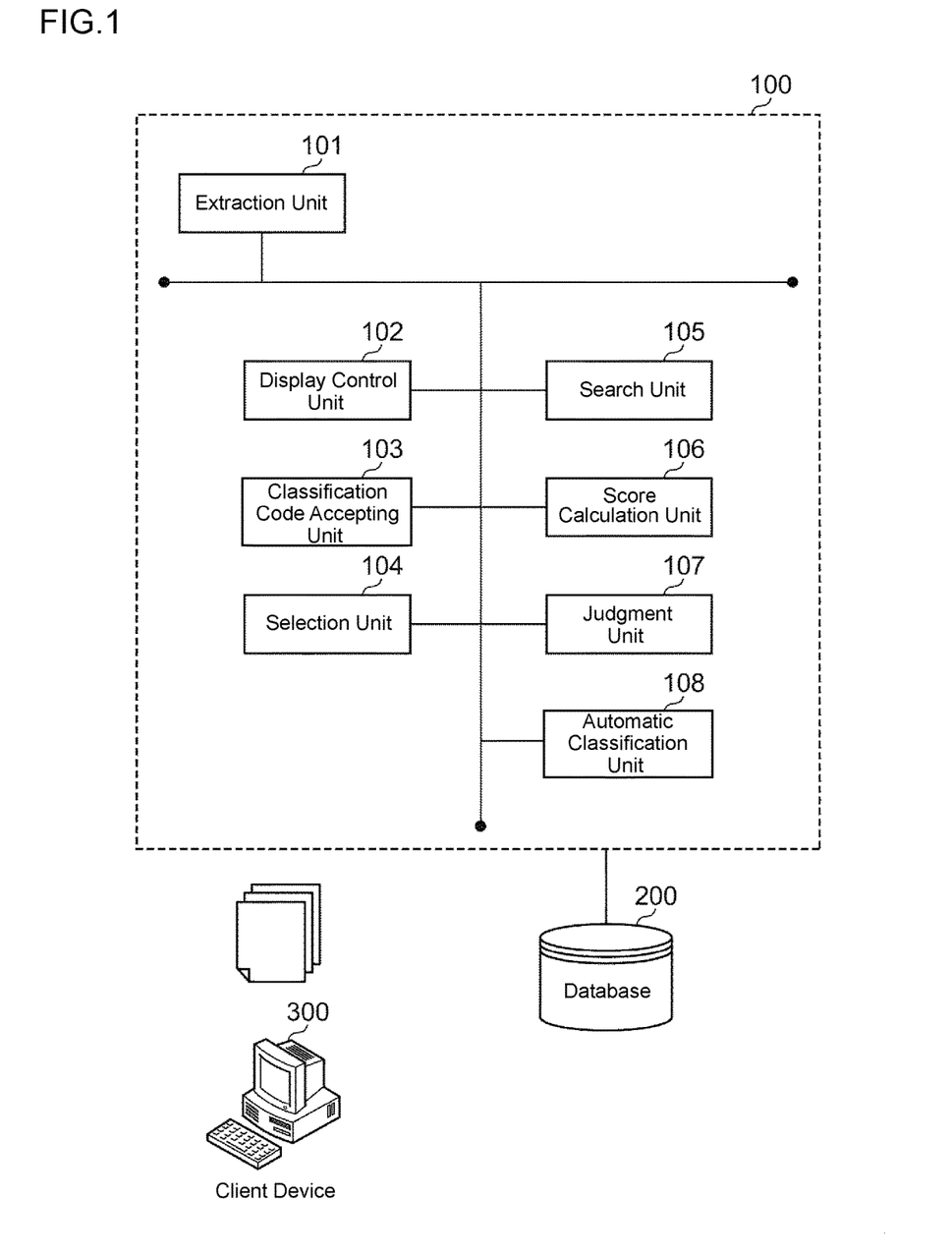
FIG. 1 is a configuration diagram of a document classification system according to an embodiment of the present invention.

An embodiment of the present invention will be explained below with reference to the attached drawings. FIG. 1 illustrates a configuration diagram of a document classification system according to an embodiment.

The embodiment is an example in which processing for classifying documents relating to product A which is an accused product is executed in response to a document submission order for a patent infringement lawsuit.

[Configuration of Document Classification System]

In the embodiment, the document classification system is configured of a document classification apparatus 100, a database 200, and a client device 300 used by a reviewer. The document classification apparatus 100 includes an extraction unit 101, a display control unit 102, a classification code accepting unit 103, a selection unit 104, a search unit 105, a score calculation unit 106, a judgment unit 107, and an automatic classification unit 108. A plurality of client devices 300 can be included in one document classification system.

The document classification apparatus 100 and the client device 300 are computers or servers and operate as various function units as a CPU executes programs recorded in a ROM according to various inputs.

The classification code is an identifier used to categorize documents. When document information is to be used as evidence for a lawsuit, the classification code may be assigned according to the type of evidence. In the embodiment, the following three codes are included as classification codes: "irrelevant" indicating a document(s) that is inadmissible for the relevant lawsuit; "relevant" indicating that it is necessary to submit the relevant document as evidence; and "important" indicating that the relevant document is particularly related to Product A; and documents to which the code "important" among the above-mentioned codes is assigned are to be classified.

Documents herein used mean digital information which is submitted as evidence for a lawsuit and is data including one or more words. For example, such documents are e-mails, presentation materials, spreadsheet materials, meeting materials, contracts, organization charts, and business plans. It is also possible to treat scan data as documents. In this case, an OCR (Optical Character Recognition) device may be provided in the document classification system so that the scan data can be converted to text data. As a result of changing the scan data to the text data by the OCR device, it becomes possible to analyze, and search for, keywords and related terms from the scan data.

For example, in the embodiment, the code "relevant" is assigned to minutes of meetings, e-mails, etc. which describe the details of meetings about Product A; the code "important" is assigned to development plans, design documents, etc. about Product A; and the code "irrelevant" is assigned to materials for, for example, regular meetings irrelevant to Product A.

Furthermore, a keyword(s) is a set of letter strings having a certain meaning in a certain language. For example, when keywords are to be selected from a sentence "classify documents," "documents" and "classify" may be keywords. In the embodiment, keywords such as "infringement," "lawsuit," and "Patent Publication No." are selected intensively.

In this embodiment, it is assumed that keywords include morphemes.

The database 200 is a recording apparatus that records data in an electronic media; and may be placed inside the document classification apparatus 100 or outside the document classification apparatus 100 as, for example, a storage apparatus.

The document classification apparatus 100, the database 200 and the client device 300 are connected to each other via a wired or wireless network. They can be used in a form of cloud computing.

The database 200 records keywords for each classification code. Also, it is possible to register keywords in advance, regarding which it can be determined, on the basis of the results of classification processing in the past, that the code "important" should be assigned to such keywords immediately when the relevant keywords are highly related to Product A and included in documents. For example, main function names of Product A and words such as "lawsuit," "warning," and "patent publication" are the keywords. It is also possible to: extract general terms that are highly related to a document group to which the code "important" is assigned because it is highly related to Product A, similarly on the basis of the result of the classification processing in the past; and register such general terms as related terms. Keywords and related terms that are registered in the database 200 once can be added, registered, and deleted manually.

The extraction unit 101 extracts a document group, which is a data set, from document information. When performing this extraction, the extraction unit 101 can perform random sampling. In the embodiment, a specified quantity of documents is randomly extracted from all pieces of document information and the extracted documents become targets to be classified by a reviewer.

Furthermore, the extraction unit 101 extracts the specified quantity of documents in a specified order relating to a score calculated by the score calculation unit 106 on the basis of the calculated score. In the embodiment, the specified order relating to the score is set to a descending order of the score, but it may be, for example, an ascending order of the score. The specified quantity herein used should preferably be within a range from top 10% to 50%, more preferably 25%, in the descending order of the score, of documents included in the document information. If the quantity of the extracted documents is too small, any enhancement of precision and a recall of the document classification result cannot be expected. Furthermore, if the quantity of the extracted documents is too large, necessary cost for classification increases. Incidentally, the quantity of documents to be extracted from the document information may be specified by the number of documents (for example, 1000) instead of a percentage (or proportion). Incidentally, the proportion and number of documents to be extracted by the extraction unit 101 from all pieces of document information can be also changed manually.

Figure 2:
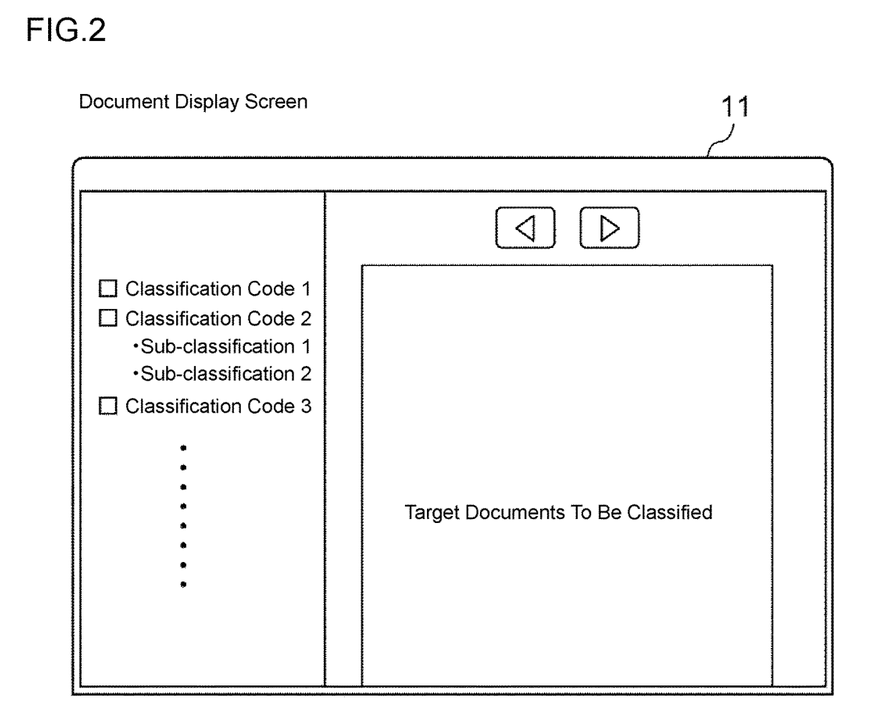
FIG. 2 is a document display screen according to an embodiment of the present invention.

The display control unit 102 presents a document display screen 11, as illustrated in FIG. 2, to the client device 300.

Referring to FIG. 2, the document display screen 11 can display documents, which become classification targets, and classification codes to be assigned to the documents in one screen in such a screen structure that the documents which are the classification targets are displayed at its center and the classification codes are displayed on the left side. A screen structure in which an area to display the documents and an area to display the classification codes are displayed on separate screens may also be employed.

In the embodiment, classification code 1 on the document display screen 11 means the code "irrelevant," classification code 2 means the code "relevant," and classification code 3 means the code "important." Furthermore, among the documents to which the code "relevant" is assigned, sub-classification 1 is assigned to documents related to the price of Product A and sub-classification 2 is assigned to documents related to a development schedule of Product A. One classification code may be provided with a plurality of sub-classifications or may not be provided with any sub-classification.

The classification code accepting unit 103 accepts the classification codes assigned on the basis of the reviewer's determination of the classification codes to be assigned to each of the documents, which are visually checked by the reviewed, from among the document information displayed by the display control unit 102. The documents can be categorized according to the assigned classification codes.

The selection unit 104 analyzes the document information on the basis of the classification result accepted by the classification code accepting unit 103 and selects keywords that frequently appear commonly in the document information to which the respective classification codes "irrelevant," "relevant," and "important" are assigned, as keywords for the relevant classification codes.

Figure 3:
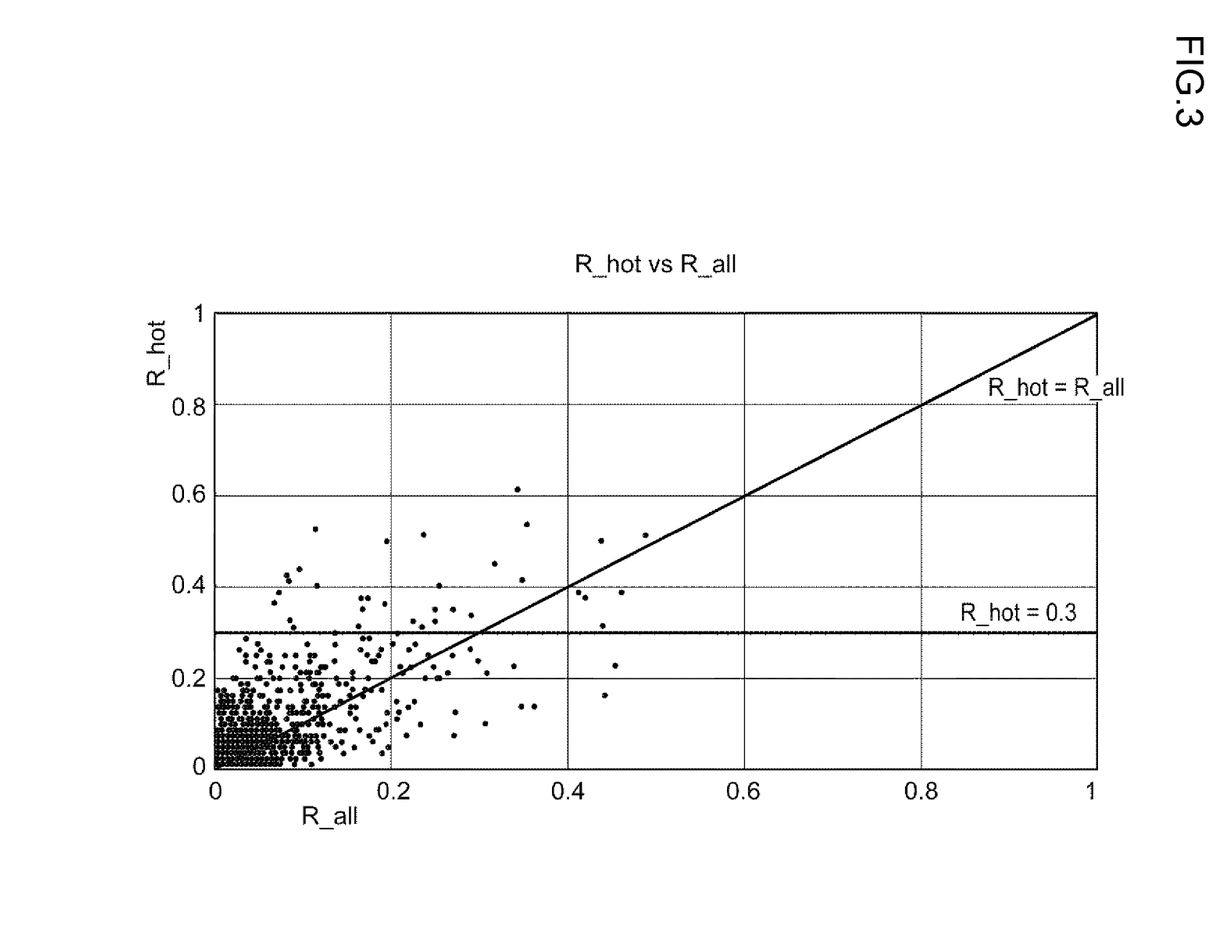
FIG. 3 is a graph illustrating analysis results by a selection unit according to an embodiment of the present invention.

FIG. 3 is a graph illustrating the analysis result of the documents, to which the code "important" is assigned, by the selection unit 104. Referring to FIG. 3, the vertical axis R_hot represents a proportion of documents which includes keywords selected as keywords linked to the code "important" and to which the code "important" is assigned, from among all the documents to which the code "important" assigned by the reviewer. The horizontal axis represents a proportion of documents including the keywords selected by the selection unit 104 from among all the documents on which the reviewer has executed the classification processing.

In the embodiment, the selection unit 104 can select keywords which are plotted above a straight line R_hot=R_all as keywords for the relevant classification code. Also, all the extracted keywords (including morphemes) may be used as long as system resources permit.

The search unit 105 is equipped with a function that searches target documents for a specified keyword(s). When searching the documents including the keywords selected by the selection unit 104 or the related terms extracted from the database 200, the search unit 105 searches a document group composed of documents, regarding which the classification code accepting unit 103 did not accept assignment of the classification codes, as the targets.

The score calculation unit 106 calculates a score according to the following expression on the basis of the keywords appearing in the document group and weighting of each keyword. The score represents quantitative evaluation of strength of linkage with a specified classification code with respect to a certain document.

$$Scr = \Sigma_{i=0}^{N}(m_i * wgt_i^2) / \Sigma_{i=0}^{N} wgt_i^2 \quad (1)$$

$m_i$: appearance frequency of i-th keyword or related term
$wgt_i$: weighting of i-th keyword or related term Incidentally, the expression (1) to calculate the above-described score is one example and other expressions may be used to calculate the score.

The judgment unit 107 judges whether the number of times of the score calculation has reached a previously stored number of times. Incidentally, the number of times of the score calculation can be also changed manually.

The automatic classification unit 108 automatically assigns the classification code to the document information on the basis of the calculated score. Furthermore, when assigning classification codes, the automatic classification unit 108 can be equipped with a function that extracts documents, regarding which the classification code accepting unit 103 did not accept assignment of any classification code, and automatically assigns the classification codes to such documents.

The client device 300 is a device which is operated and used by the reviewer to check the document information and determine the classification codes to assign.

[Operation of Document Classification System]

Figure 4:
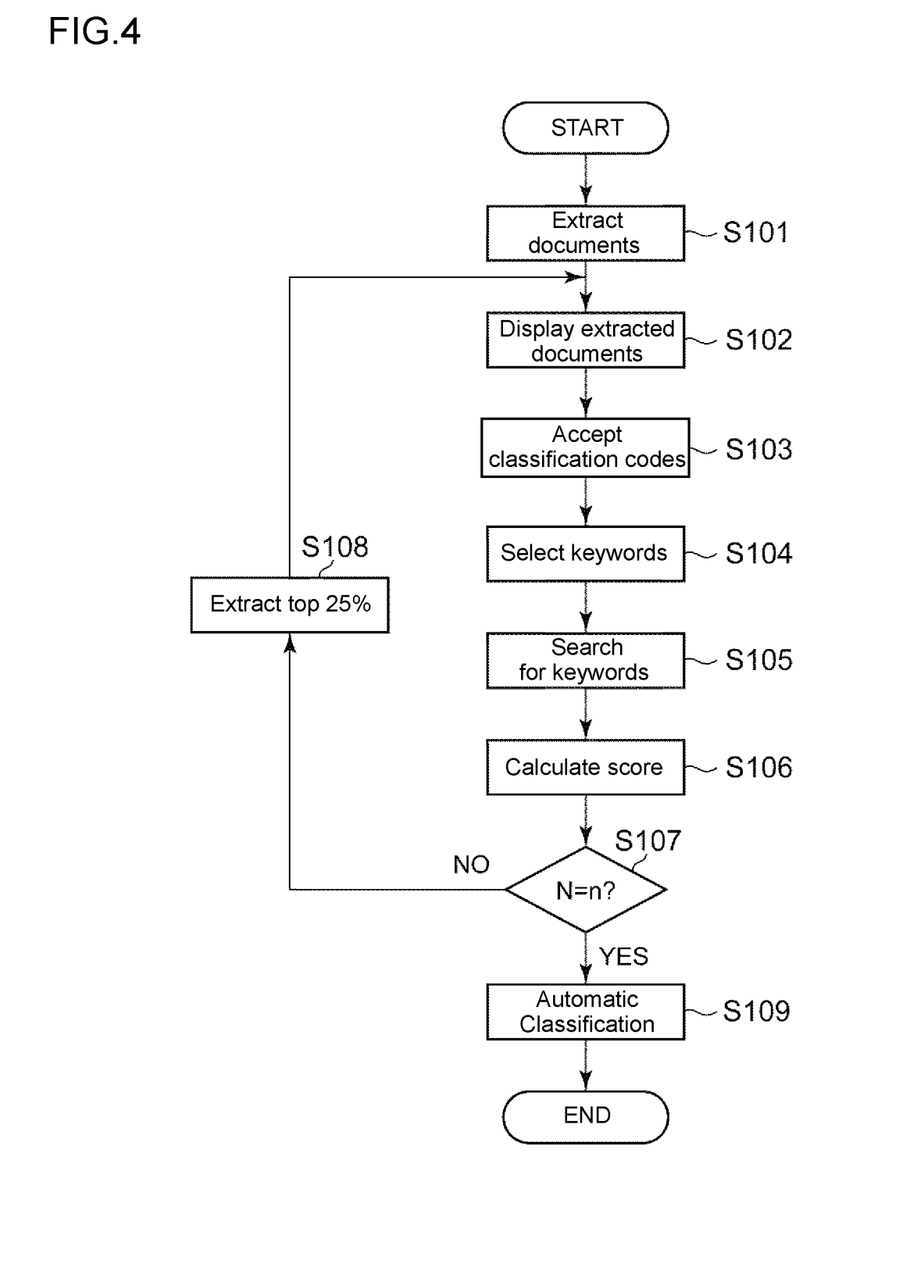
FIG. 4 is a flowchart illustrating operation of the document classification system according to an embodiment of the present invention.

FIG. 4 is a flowchart illustrating the operation of the document classification system according to the embodiment. The extraction unit 101 firstly extracts a document group, which is a data set, from the document information which is a classification target (step S101).

The display control unit 102 presents the document display screen of the documents, which have been extracted by the extraction unit 101, to the client device 300 (step S102).

The classification code accepting unit 103 accepts the classification code assigned to each document visually checked by the reviewer from among the document information displayed by the display control unit 102 (step S103).

The selection unit 104 analyzes the document information categorized by the classification code accepting unit 103 and selects keywords that frequently appear commonly in the document information which is assigned the respective classification codes "irrelevant," "relevant," and "important," as keywords for the relevant classification codes (step S104).

The search unit 105 searches the target documents for specified keywords (step S105).

The score calculation unit 106 calculates the score of each document according to the aforementioned expression (1) on the basis of the keywords appearing in the document group and weighting of each keyword (step S106).

The judgment unit 107 judges whether the number of times of the score calculation has reached the number of times of the score calculation which is set by the user or stored in advance (N=n) (step S107).

When the number of times of the score calculation has not reached the predetermined number of times (No in step S107), the extraction unit 101 extracts a specified quantity (for example, top 25%) of documents in a descending order of the calculated score on the basis of the score calculated by the score calculation unit 106 (step S107) and repeats the operation from step S102 to step S107 on the extracted documents.

When the number of times of the score calculation has reached the predetermined number of times (Yes in step S107), the automatic classification unit 108 automatically assigns the classification codes to the document information (all the documents) on the basis of the calculated score (step S109).

In this embodiment as described above, the specified quantity (for example, top 25%) of documents is extracted on the basis of the score calculated for each document included in the document information and the score of each document is then recalculated on the basis of the classification result of these extracted documents. Therefore, the precision and the recall of the document classification result by the automatic classification unit 108 can be enhanced.

Incidentally, in the above-described embodiment, the score of the document information is calculated on the basis of the keywords searched by the search unit 105; however, the score of the document information may be calculated by using keywords registered in the database 200 in advance. Furthermore, the score of the document information may be calculated by using a plurality of keywords (keyword set). Furthermore, the invention may be configured so that the score of the document information is calculated by using different keywords or keyword sets every time the score of the document information is calculated.

Other Embodiments

Furthermore, the document classification apparatus 100 may be equipped with a document exclusion unit and a learning unit. The document exclusion unit can: search document information, which is a classification target, for documents which do not include any of the keywords and related terms registered in the database 200 in advance or the keywords selected by the selection unit 104; and exclude the documents found by the search from the classification targets in advance.

Furthermore, the learning unit learns the weighting of each keyword on the basis of the result of the classification processing and then increases or decreases the keywords and related terms registered in the database 200 on the basis of the learning result. The weighting of each keyword can be determined on the basis of a transmitted information amount which the relevant keyword has with respect to each classification code. Such weighting can be learned as a result of repeated execution of the classification processing according to the following expression, thereby making it possible to enhance accuracy.

$$wgt_{i,L} = \sqrt{wgt_{L-i}^2 + \gamma_L wgt_{i,L}^2 - \theta} = \sqrt{wgt_{L,i}^2 + \Sigma_{l=1}^{L}(\gamma_l wgt_{i,l}^2 - \theta)} \quad (2)$$

$Wgt_{i,0}$: weight (initial value) of i-th selected keyword before learning
$Wgt_{i,L}$: weight of i-th selected keyword after L-th learning
$\gamma_L$: learning parameter for L-th learning
$\theta$: threshold value of learning effect Furthermore, the learning unit can employ a learning method for reflecting the classification result in the weighting by using a neural network.

The embodiment has described particularly about an example of a patent infringement lawsuit case; however, the document classification system according to the present invention can be used for any lawsuits, such as those relating to such as cartels and the Antimonopoly Act, which adopt the eDiscovery (electronic discovery) system and for which the obligation to submit documents is required.

The document classification system, document classification method, and document classification program according to the present invention extract the specified quantity of documents on the basis of the score calculated for each documents and then recalculate the score of each document on the basis of the classification result of these extracted documents. Accordingly, the precision and recall of the document classification result can be enhanced.

Furthermore, when the present invention is equipped with the learning unit which increases or decreases keywords and related terms having a correlation between the analysis result by the selection unit and the classification codes which are selected by the selection unit on the basis of the score calculated by the score calculation unit and recorded in the database, classification accuracy can be enhanced as the number of times of classification is increased.

Furthermore, the present invention makes it possible: for the database to extract and record related terms which are related to the classification codes; for the search unit to search the document information for the related terms; for the score calculation unit to calculate the score on the basis of the result of the search for the related terms by the search unit; for the automatic classification unit to automatically assign the classification codes on the basis of the score calculated by using the related terms; to select documents, which do not include keywords having the correlation with the keywords, the related terms, and the classification codes which are selected by the selection unit, from among documents included in a document group; and to classify the documents more efficiently when excluding the documents selected from the classification target of the automatic classification unit. This makes it easier to use the collected digital information for a lawsuit.

Example

Figure 5:
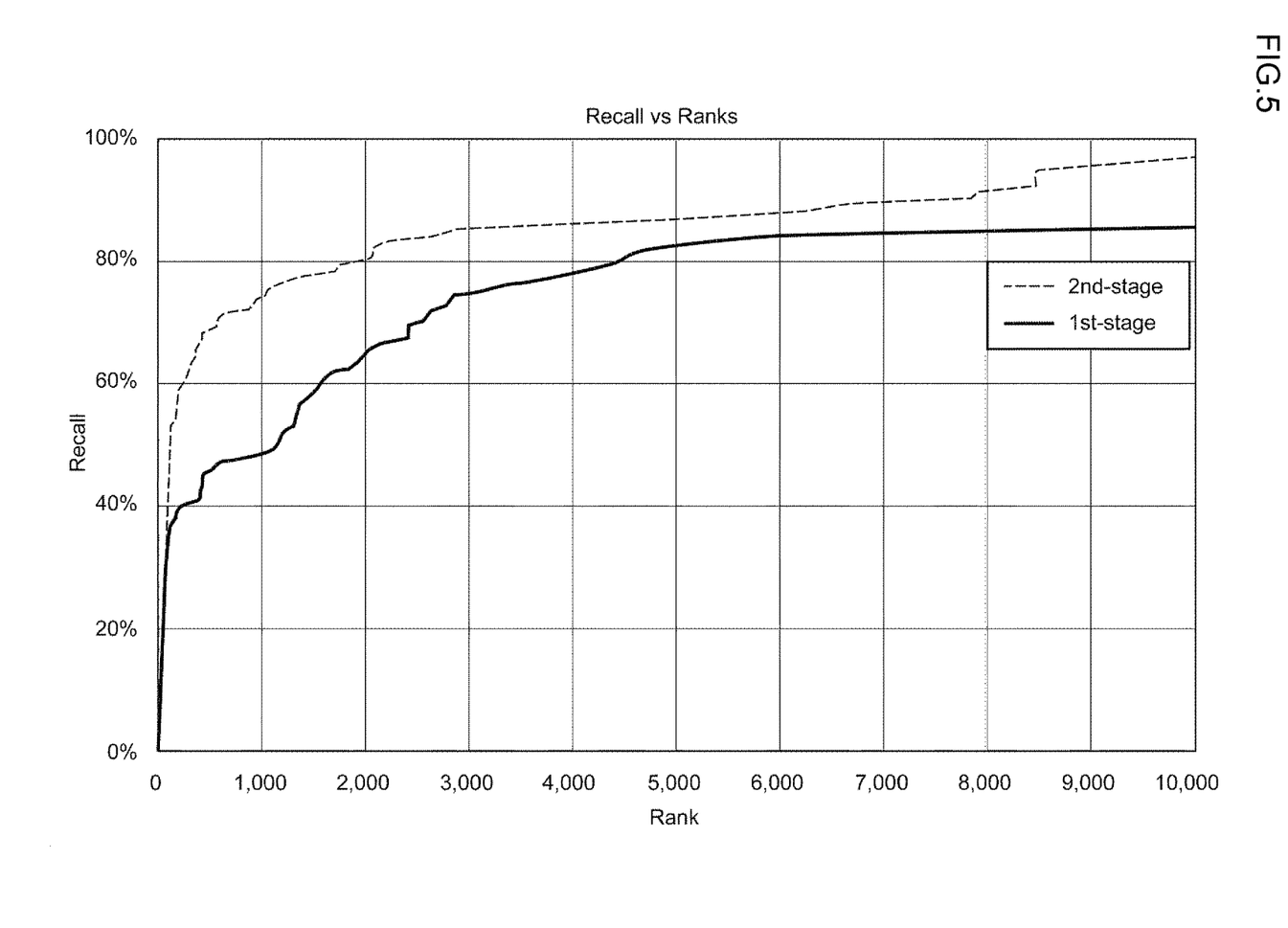
FIG. 5 is a graph illustrating processing results in an example.

FIG. 5 is a graph illustrating the result of the classification processing according to an example. Referring to FIG. 5, the vertical axis is a recall (Recall) and the horizontal axis is a rank (Rank). The term "recall" herein used is an index for comprehensiveness indicative of how many documents, among all documents included in the document information and related to a lawsuit, are classified by the automatic classification unit 108. For example, assuming that the number of all the documents included in the document information and related to the lawsuit is 100 and the number of documents classified by the automatic classification unit 108 as being related to the lawsuit is 80, the recall is 80%. Furthermore, the "Rank" is a rank (rank order) of each document according to the score calculated by the score calculation unit 106.

Referring to FIG. 5, when the score was calculated twice (a dashed line in FIG. 5) as compared to a case where the score was calculated only once (a solid line in FIG. 5), you can see that the recall has been enhanced significantly. In other words, you can see that accuracy of the classification result of the document information has been enhanced significantly. Incidentally, in this example, top 25% of the documents are extracted on the basis of the first (First Stage) score calculation and then the second (Second Stage) score calculation is performed on the basis of the extracted document classification result.

Other Examples

[Score Calculation Based on Co-Occurrence]

The score calculation unit can calculate the score based on an evaluation result of a first keyword included in a document and an evaluation result of a second keyword included in the document. Specifically speaking, when the first keyword appears in the document, the score calculation unit can calculate the score of the document in consideration of frequency at which the second keyword appears in that document (that is, such frequency can be also called the correlation or co-occurrence between the first keyword and the second keyword).

In this case, the score calculation unit can calculate score S according to the following expression by using a correlation matrix (co-occurrence matrix) C representing the correlation (co-occurrence) between the first keyword and the second keyword.

$$S = w^T \cdot (C \cdot s)$$

Incidentally, the above correlation matrix C is optimized in advance by using learning data which includes only a specified quantity of specified documents. For example, when the keyword "price" appears in a certain document, a value obtained by normalizing the number of appearances of other keywords relative to the relevant keyword between 0 and 1 (which may also be referred to as the maximum likelihood estimate) is stored in each element of the above-mentioned correlation matrix C (so that the total sum relative to the respective columns of the above-mentioned correlation matrix C becomes 1).

Since the document classification system can calculate the score in consideration of the correlation between the keywords as described above, it is possible to extract data related to a specified case (such as a lawsuit) with higher accuracy.

[Score Calculation for Each Sentence]

The score calculation unit can calculate the score for each sentence included in each document. In this case, the score calculation unit generates, for each sentence, a keyword vector indicating whether or not a specified keyword is included in each sentence included in the document. Then, the score calculation unit 14 calculates the score for each document according to the following expression.

$$S = w^T \cdot TFnorm\left(\sum_{i=1}^{M} C \cdot s_i\right)$$

In the above expression, $s_s$ represents a keyword vector corresponding to an s-th sentence. It should be noted that the above-described score is calculated in consideration of co-occurrence (the co-occurrence matrix C is used).

TFnorm can be calculated as indicated as follows.

$$TFnorm\left(\sum_{i=1}^{M} C \cdot s_i\right) = \left(1 + \frac{\sum_{i=1}^{M}\sum_{j\ne1}^{n} c_{1,j}s_{ji}}{TF_1},\right.$$
$$\left. 1 + \frac{\sum_{i=1}^{M}\sum_{j\ne2}^{n} c_{2,j}s_{ji}}{TF_2}, \dots, 1 + \frac{\sum_{i=1}^{M}\sum_{j\ne n}^{n} c_{nj}s_{ji}}{TF_n}\right)^T$$

In the above expression, $TF_i$ represents appearance frequency (Term Frequency) of an i-th keyword, $s_{ji}$ represents a j-th element of the i-th keyword vector, and $c_{ji}$ represents a j-th row, i-th column element of the correlation matrix C.

In summary of the above, the score calculation unit calculates the above-described score for each document by calculating the following expression.

$$S = \sum_{i=1}^{n}\left\{w_i\left(1 + \frac{\sum_{s}^{N}\sum_{j\ne n}^{n} c_{ij}s_{js}}{TF_i}\right)\right\}$$

In the above expression, $w_i$ is an i-th element of the weight vector w.

Since the document classification system can calculate the score which accurately reflects the meaning of the sentence as described above, it is possible to extract data related to the specified case with higher accuracy.

[Phase Analysis]

The document classification system can estimate a phase, in which a specified case belongs, and calculate the score according to that phase. The above-mentioned term "phase" herein used is an index indicative of each stage of progress of the above-mentioned specified case (in order for categorization according to the progress of the above-mentioned specified case).

For example, when the above-mentioned specified case is a fraudulent act case of "bid-rigging with other companies" and the purpose of the document classification system is to detect a prediction of the fraudulent act case by judging whether emails which are exchanged daily over the network are related to the fraudulent act case or not, the above-mentioned phase may include, for example, a "preparation phase of collecting information about bid-riggings with other companies," a "relation construction phase of constructing the relation with customers and competitors," and a "competitive phase of presenting prices to customers, receiving feedback, and communicating with competitors with respect to the feedback."

Furthermore, time-series information and generation process information are stored in the storage unit (database). Under this circumstance, the above-mentioned "time-series information" is information indicative of a temporal order of the above-mentioned phases and may be, for example, a time development model indicating phases which start from the "preparation phase," and then proceeds to the "relation construction phase," and finally reach the "competitive phase." Furthermore, the above-mentioned "generation process information" is information which models the process of generating each keyword in a certain phase, and may be, for example, a multinominal distribution model defined for each phase.

A result acquisition unit acquires, as a review result, a result of judgment by the reviewer on whether a document is related to a specified case or not, and a result of judgment on which phase of the above-mentioned specified case the relevant document belongs to; and an element evaluation unit evaluates keywords included in the document with respect to each of the above-mentioned phases (that is, decides the weight of each keyword).

When calculating a score for an unclassified document, the score calculation unit estimates which phase the relevant document belongs to, on the basis of the above-mentioned generation process information. Specifically speaking, the score calculation unit calculates likelihood with respect to each phase on the basis of generation process information and estimates a phase which maximizes the likelihood, to be the phase of the relevant document. Then, the score calculation unit calculates the score of each document by using the weight corresponding to the estimated phase. Under this circumstance, the score calculation unit may use the correlation matrix C corresponding to the relevant phase.

A relation assignment unit (automatic classification unit) can display documents set by a data setting unit in a browsable manner and display the estimated phase. Under this circumstance, the relation assignment unit can predict the possibility and time for the estimated phase to develop to the next phase, on the basis of the above-mentioned time-series information and also display the predicted result.

Since the document classification system can calculate the score accurately according to the phase, it is possible to extract data related to the specified case with higher accuracy.

[Recalculation of Weight]

After the documents set by the data setting unit (documents which are determined by the document classification system to be related to the specified case) are displayed in a browsable manner by the relation assignment unit, the result acquisition unit can accept feedback about such determination from the reviewer. Specifically speaking, the reviewer can input whether each result determined by the document classification system is reasonable or not, as the feedback. Then, the element evaluation unit can re-evaluate each keyword on the basis of the above-mentioned feedback.

In other words, the element evaluation unit can recalculate the weight on the basis of feedback newly obtained with respect to the determination by the document classification system. Accordingly, the document classification system can: obtain the weight that matches a target document to be analyzed; and calculate the score based on the weight. So, it is possible to extract data related to the specified case with higher accuracy.

[Display of Correlation Between Persons and Organizations]

The data setting unit can visualize linkage strength between a plurality of persons or organizations by extracting proper nouns appearing in the documents (for example, unique data elements such as persons' names, companies' names, and names of locations) and estimating the correspondence relationship between a specified proper noun (a first unique data element) and another proper noun (a second unique data element).

For example, when as a result of analyzing an e-mail sent from person A to person B as a document, a sentence reciting "I will tell C" is included in that document, the data setting unit can extract "person A," "person B," and "person C" and display a chart in which a node indicative of "person A" is connected via arrows respectively to a node indicative of "person B" and a node indicative of "person C." In this case, the data setting unit may display the above-mentioned chart so that the widths of the arrows vary depending on the strength of the correlation between the persons or organizations.

Since the document classification system can easily recognize and display the correlation between persons and organizations on the basis of results of analyzing documents as described above, a subject(s) who may cause a fraudulent act case can be identified without fail.

[Configuration where Server Apparatus Provides Part or all of Functions]

The above explanation has been given about the configuration (stand-alone configuration) where a control program (a control program for a document analysis system) capable of providing a data analysis function is executed mainly by the document classification system. On the other hand, another configuration (cloud configuration) may be possible where part or whole of the above-mentioned control program is executed at a server apparatus and the result of the executed processing is returned to the above-mentioned document classification system (user terminal). Specifically speaking, the document classification system according to the present invention can function as the server apparatus connected to the user terminal via the network so that they can communicate with each other. As a result, when the above-mentioned document classification system provides the function, the server apparatus can have the same advantageous effects as those of the document classification system.

[Implementation Examples by Software]

A control block of the document classification system may be implemented by a logical circuit (hardware) formed on, for example, an integrated circuit (IC chip) or may be implemented by software using a CPU (Central Processing Unit). In the latter case, the document classification system 100 includes, for example: a CPU for executing commands of a control program which is software for implementing each function; a ROM (Read Only Memory) or a storage device (collectively referred to as the "storage media") in which the above-mentioned control program and various kinds of data are recorded in a manner such that they can be read by the computer (or CPU); and a RAM (Random Access Memory) for expanding the above-mentioned control program. Then, the object of the present invention is achieved as the computer (or CPU) reads the above-mentioned control program from the above-mentioned storage media and executes it. As the above-mentioned storage media, "tangible media which are not temporary" such as tapes, disks, cards, semiconductor memories, or programmable logical circuits can be used. Furthermore, the above-mentioned control program may be supplied to the above-mentioned computer via an arbitrary transmission medium capable of transmitting the relevant control program (such as a communication network or a broadcast wave). The present invention can also be implemented in a form of a data signal embedded in a carrier wave in which the above-mentioned control program is embodied via electronic transmission.

It should be noted that the above-described control program can be implemented by using, for example, a script language such as Python, ActionScript, or JavaScript (registered trademarks), an object-oriented programming language such as Objective-C or Java (registered trademarks), and a markup language such as HTML5. Furthermore, an analysis system including an information processing apparatus (for example, the document classification system 100) equipped with respective units, which implement the respective functions implemented by the above-described control program, and a server apparatus equipped with respective units, which implement the remaining functions different from the above-mentioned respective functions, also falls under the category of the present invention.

[Examples Applied to Data Other than Documents]

The document classification system for analyzing documents has been described as one form of implementing the document classification system according to the present invention; however, the relevant document classification system can also analyze data other than documents.

For example, the document classification system according to the present invention can also be implemented in a form of a voice analysis system for analyzing voices. In this case, the above-mentioned voice analysis system may: (1) recognize voices and thereby convert the content of conversations included in the voices into characters (document data) and then process the document data in the same manner as the above-mentioned document classification system; or (2) process voice data directly.

In the case (1) above, the above-mentioned voice analysis system converts voice data into document data by using an arbitrary voice recognition algorithm (such as a recognition method using the hidden Markov model) and executes processing, which is the same as the processing executed by the document classification system, on such document data. As a result, the above-described voice analysis system has the same advantageous effects as those of the above-mentioned document classification system.

In the case (2) above, the above-mentioned voice analysis system can classify whether the relevant voice data is related to a specified case or not, by extracting partial voices included in the voice data. For example, if voice data stating "adjust the price" is obtained, the voice analysis system extracts partial voices "price" and "adjust" from the relevant voice data and assign relation information to unclassified voice data on the basis of the evaluation result of such partial voices. In this case, the voice analysis system can classify the voice data by using categorization algorithms for time-series data (such as the hidden Markov model, Kalman filter, or neural network). As a result, the above-described voice analysis system has the same advantageous effects as those of the above-mentioned document classification system.

The document classification system according to the present invention can be also implemented in a form of a picture analysis system for analyzing pictures (videos). In this case, the above-mentioned picture analysis system can extract frame images included in video data and identify a person(s) included in the frame images by using an arbitrary face recognition technique. Furthermore, the above-mentioned picture analysis system can extract motions (movements) of the above-mentioned person(s) from partial pictures (pictures including part of all frame images included in the above-mentioned pictures) included in the above-mentioned video data by using an arbitrary motion recognition technique (which may be, for example, a technique applying a pattern matching technique). Then, the above-mentioned picture analysis system can classify the above-mentioned video data on the basis of the above-mentioned person(s) and/or the motions. As a result, the above-mentioned picture analysis system has the same advantageous effects as those of the above-mentioned document classification system.

Specifically speaking, the document classification system according to the present invention can analyze digital data (such as documents, voices, and pictures) in which information develops in chronological order. As a result, the above-mentioned document classification system has the advantageous effect of being capable of extracting data related to the specified case (for example, being capable of detecting a prediction of occurrence of a fraudulent act) by analyzing present data based on the analysis result of past data (such as documents, voices, and pictures).

[Supplement]

The present invention is not limited to each of the aforementioned embodiments and various changes can be made within the scope indicated in claims and embodiments which can be obtained by combining technical means respectively disclosed in different embodiments as appropriate are also included in the technical scope of the present invention. Furthermore, a new technical feature can be formed by combining the technical means disclosed in each embodiment.

REFERENCE SIGNS LIST 100 document classification apparatus
101 extraction unit
102 display control unit
103 classification code accepting unit
104 selection unit
105 search unit
106 score calculation unit
107 judgment unit
108 automatic classification unit
200 database
300 client device

The invention claimed is:

1. A document classification system, comprising:
a processor;
a score calculation unit that calculates a score, which evaluates linkage strength between documents and a classification code that is an identifier used when categorizing the documents, for each of the documents;
an extraction unit that extracts documents on the basis of the calculated score;
a classification code accepting unit that accepts, from among a plurality of classification codes assigned by a user to the extracted documents, the classification code;
a selection unit that classifies the extracted documents on the basis of the classification code and analyzes keywords which are included in the classified documents whose classification codes are identical; and
a search unit that searches the documents for the analyzed keywords;
wherein the score calculation unit re-extracts a specific quantity of the documents on the basis of the calculated score,
wherein the classification code accepting unit re-accepts at least one classification code, from among the plurality of classification codes which are assigned by the user to each of the specific quantity of re-extracted documents,
wherein the selection unit classifies each of the specific quantity of the documents by the at least one classification code, and
wherein the score calculation unit recalculates the score for each of the specific quantity of the documents by using a search result by the search unit and an analysis result by the selection unit.

2. The document classification system according to claim 1,
wherein the document classification system repeats extracting the documents in descending order of the calculated score and newly calculating the score for the extracted documents for a plurality of number of times.

3. The document classification system according to claim 1,
wherein the score calculation unit calculates the score according to the keywords appearing in the documents and weighting of each keyword.

4. The document classification system according to claim 1,
wherein the score calculation unit changes at least either a type or number of the keywords every time the score is calculated.

5. A document classification method performed by a computing device, the document classification method comprising:
calculating a score, which evaluates linkage strength between documents and a classification code that is an identifier used when categorizing the documents, for each of the documents;
extracting documents on the basis of the calculated score;

accepting, from among a plurality of classification codes assigned by a user to the extracted documents, the classification code;

classifying the extracted documents on the basis of the classification code and analyzing keywords which are included in the classified documents whose classification codes are identical;

searching the documents for the analyzed keywords;

re-extracting a specific quantity of the documents on the basis of the calculated score;

re-accepting at least one classification code, from among the plurality of classification codes which are assigned by the user to each of the specific quantity of re-extracted documents;

reclassifying each of the specific quantity of the documents by the at least one classification code; and recalculating the score for each of the specific quantity of the documents by using a search result and an analysis result.

6. A document classification program, stored in a non-transitory computer-readable medium, for having a computer implement: an extraction function that extracts a specified quantity of documents, as targets to be classified by a user, from document information;

a classification code accepting function that accepts a classification code which is an identifier used when categorizing the documents, and is assigned by the user to each of the extracted documents;

a score calculation function that refers to a database that records keywords selected from the extracted documents on the basis of the classification code, and calculates a score which evaluates linkage strength between documents included in the document information, and the classification code on the basis of the keywords; and a judgment function that judges whether the number of times of the calculation of the score has reached a specified number of times or not;

wherein when the judgment function determines that the number of times of the calculation of the score has not reached the specified number of times, the score calculation function recalculates the score on the basis of a result of further extraction, by the extraction function, of a specified quantity of documents, as targets to be classified by the user, from the document information according to the score.

* * * * *